United States Patent

Chen et al.

[15] 3,638,039

[45] Jan. 25, 1972

[54] OPERATION OF FIELD-EFFECT TRANSISTOR CIRCUITS HAVING SUBSTANTIAL DISTRIBUTED CAPACITANCE

[72] Inventors: Vallon Wei-Loong Chen, Edison, N.J.; Hiroshi Amemiya, Morrisville, Pa.

[73] Assignee: RCA Corporation

[22] Filed: Sept. 18, 1970

[21] Appl. No.: 73,507

[52] U.S. Cl. ..............................307/238, 307/246, 307/251, 307/304, 340/173 FF

[51] Int. Cl. ..........................................................G11c 11/34

[58] Field of Search ..................307/246, 251, 270, 293, 304; 340/173 FF

[56] References Cited

UNITED STATES PATENTS 3,343,130 9/1967 Petschauer et al. ....................307/238

3,440,444 4/1969 Rapp ....................................307/238

3,535,699 10/1970 Gaenesslen et al. ................340/173 FF

*Primary Examiner*—Stanley D. Miller, Jr.

*Attorney*—H. Christoffersen

[57] ABSTRACT

The distributed capacitance at circuit nodes between conduction paths of interconnected field-effect transistors of a memory decoder is maintained charged to a fixed value during the major portion of the memory operating time. As one example, the distributed capacitance at a column of the memory may be connected to the charging source except for the brief intervals during which a location in that column is being accessed. Operation in this way improves both the speed and reliability of the decoder circuit.

11 Claims, 3 Drawing Figures

INVENTORS
Vallon W. L. Chen &
Hiroshi Amemiya
BY Samuel Cohen
ATTORNEY

INVENTORS
Vallon W. L. Chen &
Hiroshi Amemiya
BY
ATTORNEY

INVENTORS
Vallon W. L. Chen &
Hiroshi Amemiya
BY [signature]
ATTORNEY

OPERATION OF FIELD-EFFECT TRANSISTOR CIRCUITS HAVING SUBSTANTIAL DISTRIBUTED CAPACITANCE

The invention described herein was made in the performance of work under a NASA contract and is subject to the provisions of Section 305 of the National Aeronautics and Space Act of 1958, Public Law 85-568 (72 Stat. 435; 42 U.S.C. 2457).

SUMMARY OF THE INVENTION

A plurality of switches, such as field-effect transistors, all connected at one terminal to a circuit node exhibiting substantial distributed capacitance. An additional, normally closed switch connects the distributed capacitance to a charging voltage source for normally maintaining this capacitance charged. In response to the closing of one of the plurality of switches or, in another embodiment, to a change in the voltage applied to one of the plurality of switches, the normally closed switch is opened.

DETAILED DESCRIPTION

Figure 1:
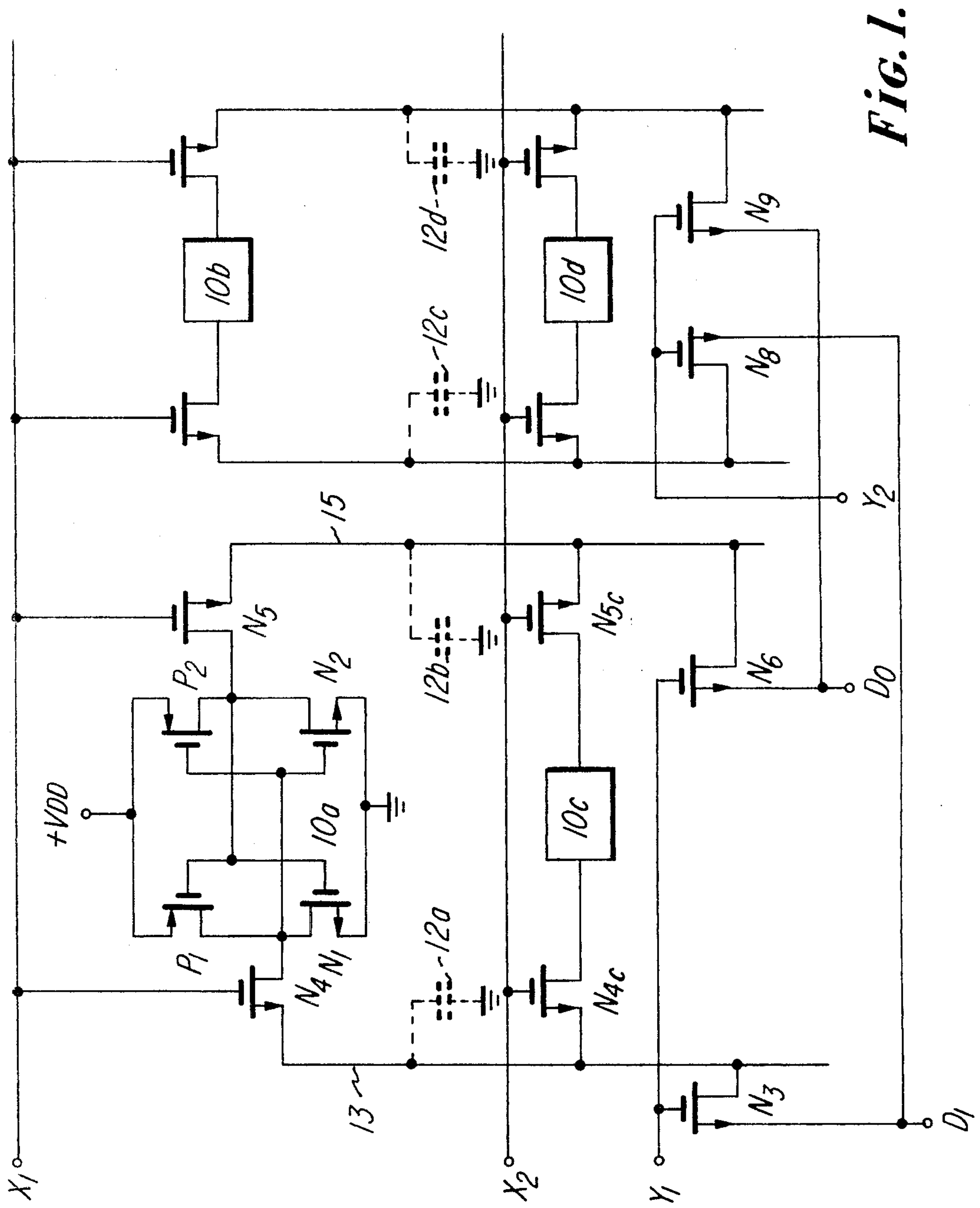
FIG. 1 is a block and schematic diagram of a portion of a field-effect transistor memory to illustrate the problem dealt with and solved in the present invention.
Figure 2:
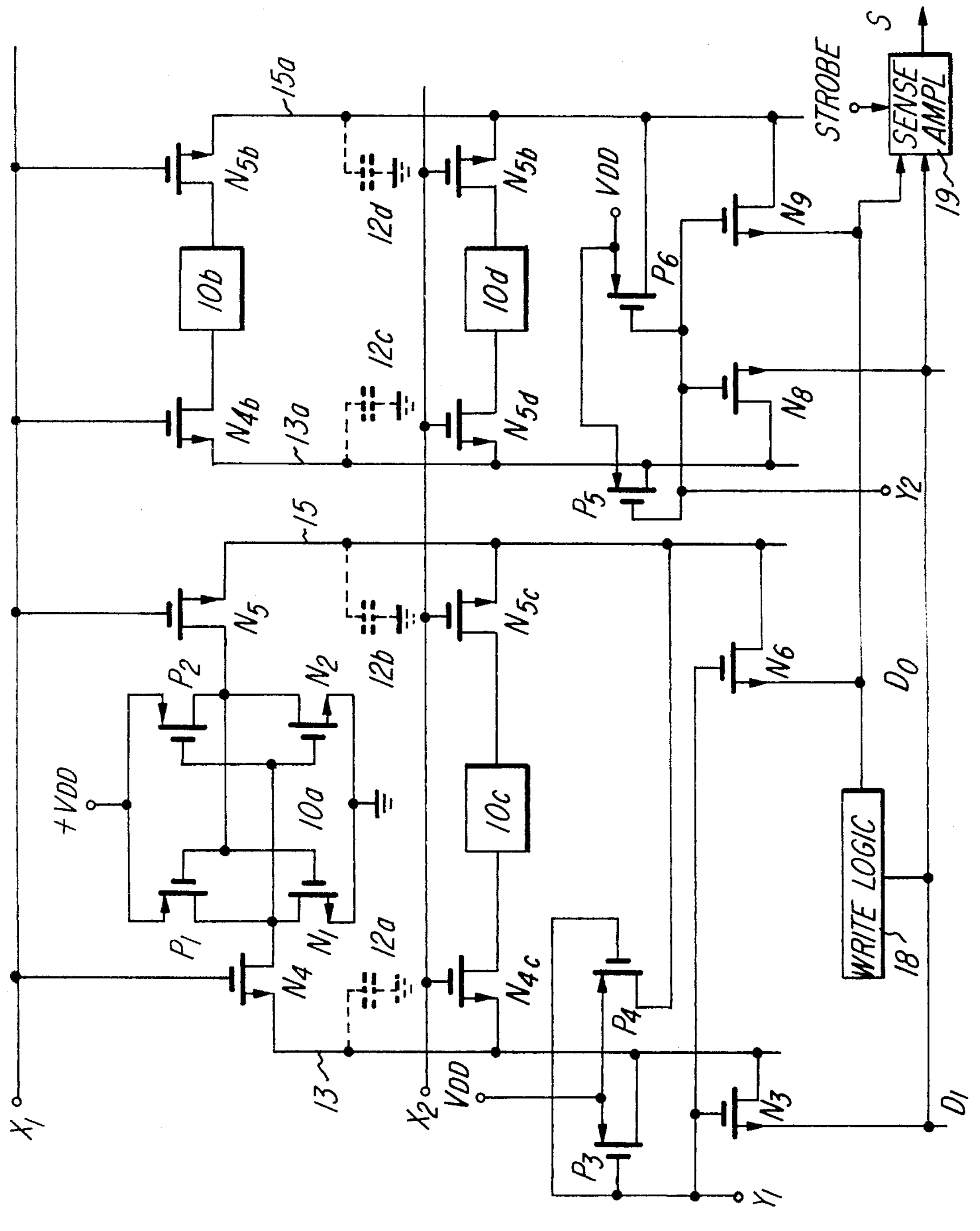
FIG. 2 is a block and schematic circuit diagram of a portion of the memory system embodying the present invention.
Figure 3:
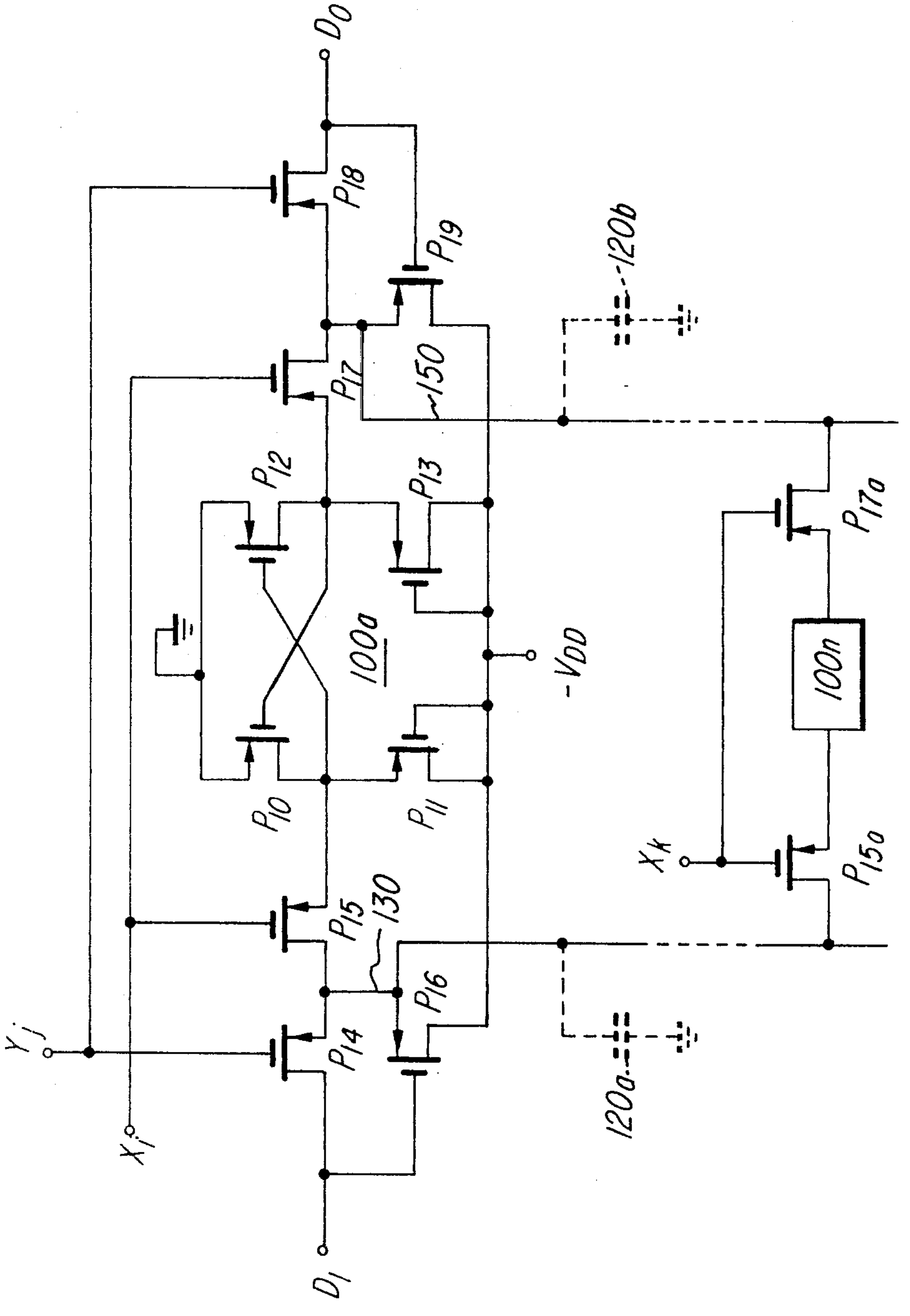
FIG. 3 is a schematic drawing of a second embodiment of the present invention.

In the discussion which follows of FIGS. 1 and 2 a relatively positive voltage level arbitrarily is assumed to represent the binary digit (bit) 1 and a relatively low voltage level such as ground is assumed to represent the bit 0 and in the discussion of FIG. 3, a relatively negative voltage level represents 1 and ground represents 0. In all figures the characters P and N used to identify transistors also indicate their conductivity types.

The memory shown in FIG. 1 includes six field-effect transistors of the metal oxide semiconductor (MOS) type per memory location. While only 2×2 locations are shown, in practice the memory may have 4×4 or 8×8 or a much larger number of such locations, and the memory matrix need not be a square array. The information 1 or 0 is stored at each location in a complementary symmetry (CMOS), four-transistor flip-flop such as 10*a*. It is shown schematically and the remaining flip-flops 10*b*–10*d* are shown in block form. The gate electrodes of transistors $P_1$ and $N_1$ are connected to the common drain connection of transistors $P_2$ and $N_2$ and the gate electrodes of transistors $P_2$ and $N_2$ are connected to the common drain connection of transistors $P_1$ and $N_1$. The source electrodes of transistors $P_1$ and $P_2$ are connected to a voltage source $+V_{DD}$ having a value such as + 10 volts. The source electrodes of transistors $N_1$ and $N_2$ are connected to a second voltage source such as ground. The two remaining transistors such as $N_4$ and $N_5$ at each location are decoder transistors.

Each column of the memory includes a pair of decoder transistors which are common to all of the X lines. These are shown at $N_3$ and $N_6$ for the $Y_1$ column and at $N_8$ and $N_9$ for the $Y_2$ column. A pair of transistors such as $N_3$, $N_6$ are connected at their gates to column line $Y_1$. The source of transistor $N_3$ is connected to line $D_1$ and the source of transistor $N_6$ is connected to line $D_O$. The drains of transistors $N_3$ and $N_6$ are connected to lines 13 and 15, respectively. All of the transistors shown in FIG. 1 may be integrated onto a common substrate.

In the operation of the memory of FIG. 1, all of the X and Y lines quiescently are at ground and the $D_1$ and $D_O$ lines quiescently are at $+V_{DD}$. To write a 1 into a memory location such as 10*a*, line $D_1$ is placed at a relatively positive voltage level such as $+V_{DD}$, $D_O$ is placed at a relatively low voltage level such as ground, the row lead $X_1$ is placed at a relatively positive voltage level such as $V_{DD}$ and column lead $Y_1$ is also placed at the same relatively positive voltage level. The relatively positive $X_1$ and $Y_1$ voltages applied to the gate electrodes of decoder transistors $N_3$, $N_4$, $N_5$ and $N_6$ place the conduction paths of these transistors in their relatively low impedance state. Accordingly, the ground level at $D_O$ is applied through the conduction paths of transistors $N_6$ and $N_5$ to the gate electrodes of transistors $N_1$ and $P_1$ turning transistor $P_1$ on and transistor $N_1$ off. With transistor $N_1$ off, the $+V_{DD}$ level at $D_1$ is applied via transistors $N_3$ and $N_4$ to the gate electrodes of transistors $P_2$ and $N_2$ turning transistor $P_2$ off and $N_2$ on. This is the one state of flip-flop 10*a* ($P_1$ and $N_2$ on, and $P_2$ and $N_1$ off).

To write a 0 into a memory location such as 10*a*, again $X_1$ and $Y_1$ are both raised to a high voltage level such as $+V_{DD}$ but now $D_O$ is made to represent a 1 ($+V_{DD}$) and $D_1$ is made to represent a 0 (ground). In response to these conditions, transistors $P_2$ and $N_1$ are turned on and transistors $P_1$ and $N_2$ are turned off. This is the zero state of the flip-flop.

While the memory above is operative, it has been found that as the memory size and speed increase, the memory operation becomes less and less satisfactory. The reason is distributed capacitance. With the memory connected as shown in FIG. 1, because of the many $N_4$ transistors (only two are shown, but in a large memory there will be many more) connected to a relatively long common line 13, and similarly the many $N_5$ transistors connected to a relatively long common line 15, a substantial amount of distributed capacitance exists at each such line. This capacitance is shown in phantom view at 12*a*, 12*b* and so on. This distributed capacitance adversely affects the decoder circuit operation in the following ways.

Assume that a 1 has been written into memory location 10*a*. During the write in time, line $D_O$ is maintained at ground. Accordingly, distributed capacitance 12*b* becomes substantially fully discharged. When the decoder lines $X_1$ and $Y_1$ are returned to ground potential, this distributed capacitance 12*b* remains discharged.

Assume now that it is desired immediately thereafter to write information into memory location 10*d*. To do this, the decoder lines $Y_2$ and $X_2$ are raised in value to a voltage $+V_{DD}$. This is a half-select condition for memory location 10*c* and its decoder transistor $N_{5C}$ (which responds to $X_2$) is placed in its on-condition, that is, its conduction path exhibits a low impedance. In view of the discharged condition of capacitor 12*b*, the transistor $N_{5C}$ tends to conduct current from storage flip-flop 10*c* to the capacitor 12*b* via line 15 for charging the capacitor. Assume also that flip-flop 10*c* is in the zero state ($P_2$ and $N_1$ on, and $P_1$ and $N_2$ off of flip-flop 10*c*). The momentary presence of the relatively large capacitance 12*b*, at ground potential, connected (via transistor $N_{5C}$) to the gate of off-transistor $P_1$ of flip-flop 10*c*, may drive transistor $P_1$ into conduction and change the state of the flip-flop 10*c*. This, of course, is highly undesirable.

In addition to the above, it can be seen that the uncharged distributed capacitance associated with a memory location tends to slow down the memory operation. Assume, for example, that when memory location 10*c* is selected, it is desired to write a 0 into this location. As already mentioned, this means that line $D_O$ goes high and line $D_1$ goes low. As transistor $N_6$ is on ($Y_1$=$+V_{DD}$) line 15 starts to go high. However, if line 15 "-sees" connected thereto a large value of distributed capacitance 12*b*, which is uncharged, line 15 cannot go high instantaneously but instead follows the charging exponential for capacitor 12*b*. Depending upon the geometry and size of the memory, the time required for line 15 to reach the potential necessary to write the information desired into a memory location may be from several tens to several hundreds of nanoseconds and this, of course, must be added to the read-write memory cycle time.

The uncharged node capacitances also adversely affect the read operation. Assume that a 1 has just been written into location 10*c* ($D_1$=$+V_{DD}$, $D_O$=0) so that distributed capacitance 12*b* is discharged and distributed capacitance 12*a* is charged to $+V_{DD}$. Now it is desired to read the information stored at some previous time at 10*a* and this information is a 0 ($N_1$ on, $P_1$ off; $N_2$ off, $P_2$ on). During a read operation, both $D_1$ and $D_2$ are high (at $+V_{DD}$) and a sense amplifier connected, for example, to both lines senses any flow of current through one of these lines. To select 10*a* for a read operation, $X_1$ and $Y_1$ are raised to $+V_{DD}$. As $N_1$ of 10*a* is on, one would expect current to flow from $D_I$ via $N_3$ and 13 through $N_4$ and $N_1$ to ground and as $N_2$ of 10*a* is off, one would expect no current flow from line $D_O$ to ground. However, in the circumstances given, capacitor 12*b* is discharged so that, momentarily, the $+V_{DD}$ present at $D_O$ does cause current flow via $N_6$ and line 15 into capacitor 12*b* until this capacitor charges sufficiently (to approximately $V_{DD}$) that transistor $N_6$ stops conducting. It is only after this interval—a matter of several tens to several hundreds of nanoseconds, that the sensing of current flow at a line such as $D_I$ becomes meaningful. Thus, the read operation must be slowed down to take into account the distributed capacitance present in the circuit.

A solution according to the present invention to the problems discussed above is shown in FIG. 2. The memory itself is similar to that already discussed. However, in addition, each column of the memory includes a pair of precharging transistors such as $P_3$ and $P_4$. These transistors are connected at their sources to a positive voltage source such as $+V_{DD}$ and at their gates to a column conduction such as $Y_1$. Transistor $P_3$ is connected at its drain to the line 13 and transistor $P_4$ is connected at its drain to the line 15. The pairs of precharging transistors for the remaining columns of the memory (only one such additional pair $P_5$ and $P_6$ is shown) are similarly connected.

In the operation of the circuit of FIG. 2, the columns $Y_1$, $Y_2$ (and the rows $X_1$, $X_2$) normally are maintained at ground just as in the circuit of FIG. 1. The ground voltage applied to the gates of the precharging transistors such as $P_3$ and $P_4$ maintain the conduction paths of these transistors in their low impedance condition. Therefore, the supply voltage $+V_{DD}$ is applied via these conduction paths to the circuit nodes 13, 15 and so on and maintain the distributed capacitance present at these nodes charged toward $+V_{DD}$.

When a memory location such as 10*a* is selected, $Y_1$ and $X_1$ both go high, and the change of $Y_1$ to its relatively positive value turns off transistors $P_3$ and $P_4$ and effectively disconnects these transistors from the lines 13 and 15. Accordingly, during the read and write cycles, the precharging transistors are out of the circuit and do not affect the circuit operation.

For the sake of completeness, the write logic circuits and the sense amplifier are shown at 18 and 19, respectively. As already mentioned, during the write operation, the logic circuits apply a signal $D_I$=1 and $D_O$=0 to the memory for writing a 1 into a selected memory location and apply the signals $D_I$=0 and $D_O$=1 for writing a 0 into a selected memory location. During the read interval, the write logic circuits cause the lines $D_I$ and $D_O$ to be at $+V_{DD}$ (binary 1) and a read strobe is applied to the sense amplifier for causing the sense amplifier to produce an output S whose value depends upon the bit stored, one or zero, in the memory location selected by the X and Y decoder voltages.

A second embodiment of the present invention, this one using transistors all of the same conductivity type, namely PMOS transistors, is illustrated in FIG. 3. Each memory location has six transistors, four of them $P_{10}$–$P_{13}$ for storing the information and two of them, such as $P_{15}$ and $P_{17}$, decoder transistors. The transistors $P_{11}$ and $P_{13}$ are connected gate to drain and act as load resistors. Transistor $P_{10}$ is connected at its gate to the drain-to-source connection between transistors $P_{12}$ and $P_{13}$, respectively. Transistor $P_{12}$ is connected at its gate to the drain-to-source connection of transistors $P_{10}$ and $P_{11}$, respectively. Transistors $P_{10}$ and $P_{12}$ are connected at their source to a voltage source such as ground. Transistors $P_{11}$ and $P_{13}$ are connected at their drain to a relatively negative voltage source $-V_{DD}$ which may be −10 volts, as an example.

Each column of the memory (only one such column is shown in FIG. 3 for purposes of illustration) has associated therewith one pair of decoder transistors such as $P_{14}$ and $P_{18}$. Transistor $P_{14}$ is connected at its drain to the $D_I$ line and at its source to the common drain connection 130 for all of the X-decoder transistors for that column. Similarly, the source electrode of Y-decoder transistor $P_{18}$ is connected to the common connection 150 to all of the drain electrodes for the X-decoder transistors of that column and the drain electrode of $P_{18}$ is connected to line $D_O$.

The pair of precharging transistors for the $Y_J$ column is $P_{16}$, $P_{19}$. Transistor $P_{16}$ is connected at its gate to the $D_I$ line at its source to the common connection 130 and at its drain to the negative voltage source $-V_{DD}$. Transistor $P_{19}$ is connected at its gate to line $D_O$ at its source to the common connection 150 and at its drain to source voltage $-V_{DD}$. The circuit distributed capacitance is shown at 120*a* and 120*b*.

In the operation of the memory of FIG. 3, all of the X and Y lines normally are at ground and the $D_I$ and $D_O$ lines normally are at $-V_{DD}$. To write a 1 into a memory location, the X and Y decoder voltages for that location are changed in value to $-V_{DD}$, $D_I$ is maintained at $-V_{DD}$ and $D_O$ is raised in value to ground potential. The $-V_{DD}$ voltage at $D_I$ turns transistor $P_{12}$ on after the ground voltage at $D_O$ turns transistor $P_{10}$ off. In similar fashion, a 0 may be written into a memory location by maintaining $D_O$ at $-V_{DD}$ and raising the potential at $D_I$ to ground during the time the X and Y decoder voltages for that location are at $-V_{DD}$.

A memory location may be read by applying appropriate decoder voltages to the decoder transistors of that location while maintaining $D_I$ and $D_2$ at $-V_{DD}$. If during the read operation, transistor $P_{12}$ is conducting, current will flow through line $D_O$ and if instead the transistor $P_{10}$ of a memory location is conducting, current will flow through line $D_I$.

In the absence of the precharging transistors $P_{16}$ and $P_{19}$, the same problems exist in the memory of FIG. 3 as in the memory of FIG. 1 because of the relatively large values of distributed capacitances 120*a* and 120*b*. Such a capacitance, when in its uncharged condition, affects the circuit reliability and slows down the memory read-write cycle. However, with the circuit modified as shown in FIG. 3, in the quiescent state of the memory, transistors $P_{16}$ and $P_{19}$ are in their low impedance condition. Therefore, the distributed capacitances at 120*a* and 120*b* become charged by the flow of current from the $-V_{DD}$ power supply terminal through the conducting transistors to the capacitances. On the other hand, when it is desired to write into a memory location as, for example, when $D_I$ is raised to ground potential, the precharging transistor $P_{16}$ is placed in the nonconducting condition and does not interfere with the write operation. Similarly, when $D_O$ is raised to ground potential, transistor $P_{19}$ turns off and disconnects $-V_{DD}$ from the capacitance 120*b*.

With the arrangement as shown in FIG. 3, the precharging transistors $P_{16}$ and $P_{19}$ slightly adversely affect the circuit operation during the read cycle. During the read operation, lines $D_I$ and $D_O$ are both maintained at $-V_{DD}$ and current flow through one of these lines is sensed. Suppose, for example, that when $X_I$=$Y_J$=$-V_{DD}$ (=binary 1) transistor $P_{10}$ of the memory location is on and current flows through this transistor $P_{10}$ through transistor $P_{15}$ to the junction 130. Preferably, all of this current should flow through transistor $P_{14}$ and to the $D_I$ line, however, since $D_I$ is at $-V_{DD}$ and transistor $P_{16}$ is still on, a portion of this current flows through transistor $P_{16}$. However, in practice, the precharging transistor $P_{16}$ is designed to have a small transconductance so that only a negligible portion of the read current is "bled away" through this transistor. While the transconductance of transistor $P_{16}$ is small, there is, nevertheless, a sufficiently long quiescent period between successive read cycles that the transistor can perform its primary job of charging the distributed capacitance such as 120*a* sufficiently to improve the circuit performance in the respects already discussed.

While the invention has been discussed in terms of CMOS circuits and PMOS circuits, it should be clear that it is equally applicable to NMOS circuits. An NMOS arrangement would be quite similar to the one of FIG. 3 except that NMOS transistors would be employed and voltages of suitable polarity to operate these devices would be used.

While in the arrangement of FIG. 3 the precharging transistors are controlled by the $D_1$ and $D_0$ lines, they may instead be controlled in a manner similar to that shown in FIG. 2. However, to obtain appropriate voltage polarities for the precharging transistors, a logical inverter would be necessary between the $Y_J$ line and the gates of transistors $P_{18}$ and $P_{19}$. This logical inverter would convert the ground voltage normally present at $Y_J$ to a $-V_{DD}$ level for quiescently maintaining the precharging transistors $P_{16}$ and $P_{19}$ on. On the other hand, when $Y_J$ changed to $-V_{DD}$ the inverter would apply ground level to the gates of $P_{16}$ and $P_{19}$ for placing these transistors in their nonconducting state.

What is claimed is:

1. A circuit for improving the operation of a circuit which includes a plurality of field-effect transistors, each having a conduction path and a control electrode for controlling the conductivity of its path, and in which said conduction paths are connected to one another at a circuit node which exhibits substantial distributed capacitance, comprising, in combination;

a precharging field-effect transistor having a conduction path connected between said circuit node and a source at a given potential, and having a control electrode for controlling the conductivity of said path;

means for normally maintaining said control electrode of said precharging transistor at a value to place the conduction path of said precharging transistor in a relatively low impedance condition, whereby said source places said circuit node at said given potential; and means responsive to a voltage applied to cause conduction through the conduction path of one of said plurality of field-effect transistors for placing said precharging transistor in a high impedance condition.

2. A circuit as set forth in claim 1 wherein said precharging transistor is of one conductivity type and said plurality of transistors are of opposite conductivity type.

3. A circuit as set forth in claim 2 wherein the control electrode of said precharging transistor is directly connected to the control electrode of said one of said plurality of transistors, said voltage applied to cause conduction through the conduction path of one of said plurality of transistors being applied to the control electrode of said one transistor.

4. A circuit as set forth in claim 1 wherein said plurality of transistors and said precharging transistor are of the same conductivity type, said control electrode of said precharging transistor being connected to an end of the conduction path of said one of said plurality of transistors.

5. A circuit as set forth in claim 4 wherein the transconductance of said precharging transistor is substantially lower than that of any of said plurality of transistors.

6. In combination;

first and second switches, the first connected between a circuit point and a voltage source of one value and the second connected between said circuit point and a voltage source of different value, one of said switches being open and the other being closed;

third and fourth normally open switches connected in series between an input terminal and said circuit point, the node between said third and fourth switches exhibiting substantial distributed capacitance to said voltage source of different value;

a fifth normally closed switch connected between a source of voltage of a value closer to said one value than to said different value and said node for normally maintaining said distributed capacitance charged; and means responsive to the closing of one of said third and fourth switches for opening said fifth switch.

7. In the combination as set forth in claim 6, said switches comprising field-effect transistors.

8. In the combination as set forth in claim 6, said second, third and fourth switches comprising field-effect transistors of one conductivity type and said first and fifth switches comprising field-effect transistors of opposite conductivity type.

9. In combination;

a circuit point;

means effectively connecting said circuit point to one of two voltage sources, the first such source having one value and the second such source having a second value;

first and second normally open switches connected in series between an input terminal and said circuit point, the node between said first and second switches exhibiting substantial distributed capacitance relative to said voltage source of second value;

a third normally closed switch connected between a source of voltage of a value closer to said one value than to said second value and said node for normally maintaining said distributed capacitance charged;

means for normally maintaining said input terminal at a value close to said one value; and means responsive to a change in voltage at said input terminal to a value close to said second value for opening said third switch.

10. In combination;

first and second normally open switches connected in series between an input terminal and a circuit point which connects to one of (a) ground and (b) a voltage source of value other than ground, the node between said first and second switches exhibiting substantial distributed capacitance to ground, whereby when said circuit point is at ground and said switches are first both closed and then both opened, said distributed capacitance, if charged, first discharges and then tends to remain discharged;

a third normally closed switch connected between a source of voltage of a value closer to that of said voltage source than to ground for normally maintaining said distributed capacitance charged;

means for normally maintaining said input terminal at a value close to that of said voltage source; and means for opening said third switch when said input terminal is placed at a value close to ground.

11. In combination;

a field-effect transistor memory circuit which at a given terminal thereof is at one voltage level when it stores a 1 and at a second voltage level when it stores a 0;

two field-effect transistors, each having a conduction path and a gate electrode for controlling the conductivity of said path;

a digit line connected to said terminal via the series connected conduction paths of said two transistors, the node between said two paths exhibiting substantial distributed capacitance;

means normally maintaining said digit line at said one of said voltage levels;

charging means normally connected to said distributed capacitance for normally maintaining said distributed capacitance charged to a level in the approximate range of said one voltage level; and means for disconnecting said charging means from said distributed capacitance when said digit line is placed at a voltage level in the approximate range of the other of said voltage levels.

* * * * *

Disclaimer 3,638,039.—*Vallon Wei-Loong Chen*, Edison, N.J., and *Hiroshi Amemiya*, Morrisville, Pa. OPERATION OF FIELD-EFFECT TRANSISTOR CIRCUITS HAVING SUBSTANTIAL DISTRIBUTED CAPACITANCE. Patent dated Jan. 25, 1972. Disclaimer filed Mar. 24, 1972, by the assignee, *RCA Corporation.*

Hereby disclaims the portion of the term of the patent subsequent to Dec. 21, 1988.

[*Official Gazette November 14, 1972.*]

Disclaimer 3,638,039.—*Vallon Wei-Loong Chen*, Edison, N.J., and *Hirochi Amemiya*, Morrisville, Pa. OPERATION OF FIELD-EFFECT TRANSISTOR CIRCUITS HAVING SUBSTANTIAL DISTRIBUTED CAPACITANCE. Patent dated Jan. 25, 1972. Disclaimer filed Aug. 27, 1973, by the assignee, *RCA Corporation*.

Hereby enters this disclaimer to claims 1, 2 and 3 of said patent.

[*Official Gazette December 11, 1973.*]